United States Patent
Ghanavi

(10) Patent No.: US 10,147,951 B2
(45) Date of Patent: Dec. 4, 2018

(54) MACROCYCLIC BATTERY

(71) Applicant: Rozhina Ghanavi, Tehran (IR)

(72) Inventor: Rozhina Ghanavi, Tehran (IR)

( * ) Notice: Subject to any disclaimer, the term of this patent is extended or adjusted under 35 U.S.C. 154(b) by 201 days.

(21) Appl. No.: 15/247,119

(22) Filed: Aug. 25, 2016

(65) Prior Publication Data
US 2016/0365580 A1    Dec. 15, 2016

(51) Int. Cl.
| | |
|---|---|
| *H01M 4/60* | (2006.01) |
| *H01M 2/16* | (2006.01) |
| *H01M 10/36* | (2010.01) |
| *H01M 4/38* | (2006.01) |

(52) U.S. Cl.
CPC ............ *H01M 4/60* (2013.01); *H01M 2/162* (2013.01); *H01M 2/1626* (2013.01); *H01M 4/38* (2013.01); *H01M 4/602* (2013.01); *H01M 10/36* (2013.01); *H01M 2300/0002* (2013.01)

(58) Field of Classification Search
CPC ...... H01M 4/60; H01M 4/602; H01M 2/1626; H01M 2/162; H01M 4/38; H01M 10/36; H01M 2300/0002
See application file for complete search history.

(56) References Cited

U.S. PATENT DOCUMENTS

| | | | |
|---|---|---|---|
| 2012/0070728 A1* | 3/2012 | Wertz ................ | C08K 7/14 429/188 |
| 2012/0148891 A1* | 6/2012 | Liao .................. | H01M 2/0235 429/94 |
| 2012/0148898 A1* | 6/2012 | Liao .................. | H01M 4/60 429/144 |
| 2013/0183582 A1* | 7/2013 | Halalay ............. | H01M 2/1653 429/212 |

* cited by examiner

*Primary Examiner* — Stewart A Fraser
(74) *Attorney, Agent, or Firm* — Barry Choobin; Patent 360

(57) ABSTRACT

A macrocyclic battery being eco-friendly, for improving the efficiency for generating electric current is disclosed. The macrocyclic battery comprises conductive electrodes, cells, and a membrane. The first cell includes a biological, an organic, or a synthetic macrocycle molecule with central ion, and the second cell includes a reducible biological, an organic, or a synthetic reducible macrocycle molecule with central ion. The membrane is used to separate the first conductive electrode to the second conductive electrode in the battery. The first cell encircling the first conductive electrode and second conductive cell encircling the second conductive electrode generates an electrical potential through an ionic transport medium. The macrocyclic battery is manufactured by easily available environmental friendly or biodegradable raw materials. The electrospinning process of the macrocycle molecules in the cells increases the surface attachment of macrocycles molecules to the electrodes for improving the efficiency for generating electric current.

14 Claims, 2 Drawing Sheets

MACROCYCLIC BATTERY

BACKGROUND

The present invention generally relates to a battery, and more particularly a battery is developed by using a macromolecule selected from biological, organic, or synthetic materials to generate electricity.

Generally, batteries, such as carbon-zinc batteries, alkaline batteries and secondary batteries, contain substantial amounts of mercury and other heavy metals, such as cobalt. These materials are environmental pollutants, when they are frequently used or released during battery manufacturing process. Currently, lithium batteries are widely adopted because of its largest energy content feature among the other type of batteries. However, the lithium batteries are unstable in electrochemical reactions, and explosions may occur due to its thermal runaway as the result of operating at low load or under improper assemblage. Therefore, it requires multiple and complex protection mechanisms, such as the installation of a protection circuit, an exhaust vent, and isolation membranes, etc.

Further, the price of the lithium batteries rises because of the depletion of lithium mineral, which is the main raw material of the electrodes of lithium batteries. The performance and operating life of the lithium batteries decrease within a high temperature environment. Some of the proposed prior arts attempted to overcome the above problem, Li et al., U.S. Pat. No. 5,729,427 discloses an electrode for electrochemical capacitor are modified with a metal macrocyclic complex made up of phthalocyanine or porphyrin ligands bound to a transition metal to achieve improved conductivity, reversibility, and charge storage capacity. The electrode is formed from a metal base and coated with an oxide, nitride or carbide of a transition metal or with a conductive polymer. This coating is modified with the metal macrocyclic complex.

Liao, U.S. Pat. No. 8,753,759 disclosed a battery at least one of the negative-electrode structure and the positive-electrode structure comprises chlorophyll. The battery could store hydrogen by the chlorophyll of the positive-electrode structure and/or the negative-electrode structure to generate electricity without causing any environmental pollution. However, still there is need for a wide variety of materials and their configuration for developing an eco-friendly and efficient batteries.

Therefore, there is a need for a battery made of easily available raw materials, and capable of being eco-friendly. There is also exists a need for an efficient battery, which could improve the efficiency for generating electric current.

SUMMARY

The present invention relates to a macrocyclic battery, which improves the efficiency for generating electric current, and being eco-friendly to the environment. In an embodiment, the macrocyclic battery comprises at least two conductive electrodes; at least two cells, and a membrane. In one embodiment, the first cell includes a biological, an organic, or a synthetic macrocycle molecule with central ion, and the second cell includes a reducible biological, an organic, or a synthetic reducible macrocycle molecule with central ion. In one embodiment, the membrane is used to separates the first conductive electrode to the second conductive electrode in the battery. In one embodiment, the first cell substantially encircling the first conductive electrode and second conductive cell substantially encircling the second conductive electrode generates an electrical potential through an ionic transport medium.

In an embodiment, the conductive electrodes are anode and cathode. In one embodiment, the conductive electrodes are selected from a group of metal comprising zinc, iron, copper, aluminium and gold, and carbon, and polymeric group comprising polyphenylene, polyphenylene, polyphenylenevinylene, polyisothianaphthene, polyphenylene sulfide, polyazulene, polyfuran, polythiophene, polyaniline, polypyrrole and derivatives thereof.

In an embodiment, the cells include biological, organic, or synthetic macrocycle are intermolecular or intra-molecular polymerized to produce polynuclear complexes. In an embodiment, the biological macrocycle molecule comprises one or more heterocyclic macrocycles includes corrin, corrinoid, chlorin, porphyrin, and bacteriochlorin. In one embodiment, the biological macrocycle molecule is selected from a group comprising hemoglobin, polyhemoglobin, or chlorophyll. In another embodiment, the biological macrocycle molecule comprises one or more polymetallic ions includes ferrous, cuprous, manganese or zinc ions. In one embodiment, the organic or synthetic macrocycle molecule is selected from a group includes crown ether, cryptand, spherand, carcerand, cyclodextrin, cyclophane, and calixarene.

In one embodiment, the cells comprising macrocycle molecules are positive or negative electrodes based on oxidation-reduction of electron complex, metal ion, or type of metallic conductive material to generate the electrical potential. In an embodiment, the membrane is a nonwoven fabric, a natural fiber, a synthetic fiber, a polymeric fiber and derivatives or combination thereof. In one embodiment, the synthetic fiber is selected from the group comprising polypropylene, polyvinylidene fluoride, or polyethylene. In an embodiment, the ion transport medium is an aqueous solution or a gel allowing the generation of the electrical potential between the first conductive electrode and the second conductive electrode.

In an embodiment, the first cell comprises electrospun nanofibers of the macrocycle molecules on the surface of the first conductive electrode. In one embodiment, the second cell comprises electrospun nanofibers of the macrocycle molecules on the surface of the second conductive electrode. In an embodiment, the macrocycle molecules are electrospun with one or more polymeric carriers and solvents in an asymmetric electric field to form an electrospun fiber on the surface of the conductive electrodes.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that evolve within the meaning and range of equivalency of the claims are to be embraced within their scope.

Figure 1:
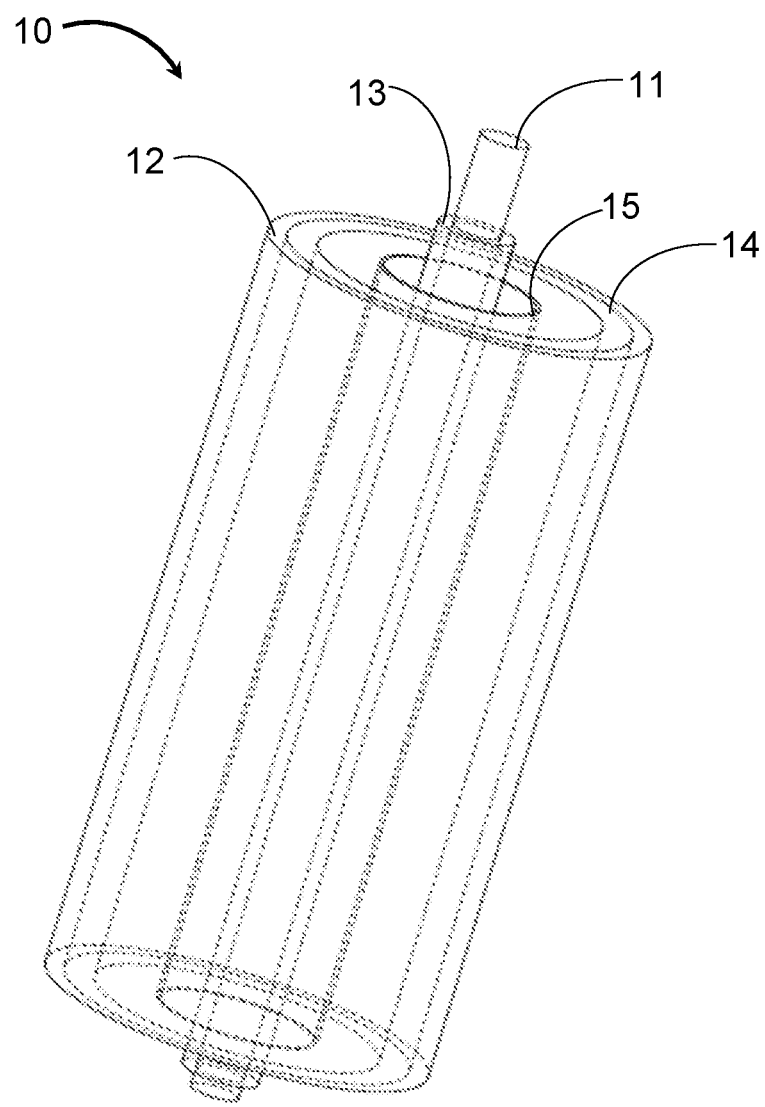
FIG. 1 shows a schematic view of the macrocyclic battery according to an embodiment.
Figure 2:
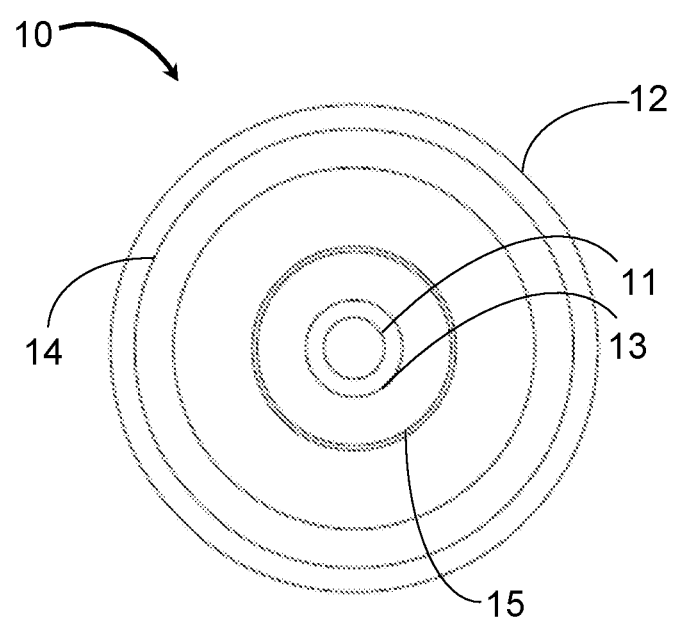
FIG. 2 shows a top view of the macrocyclic battery according to an embodiment.

The present invention relates to a macrocyclic battery 10, which improving the efficiency for generating electric current, and being eco-friendly to the environment. Referring to FIG. 1 and FIG. 2, the macrocyclic battery 10 comprises two conductive electrodes of first conductive electrode 11 and second conductive electrode 12 such as anode and cathode; at least two cells of first cell 13 and second cell 14, and a membrane 15. In one embodiment, the first cell 13 includes a biological, an organic, or a synthetic macrocycle molecule with central ion, and the second cell 14 includes a reducible biological, an organic, or a synthetic reducible macrocycle molecule with central ion. In one embodiment, the membrane 15 is used to separate the first conductive electrode 11 to the second conductive electrode 12 in the battery 10. In one embodiment, the first cell 13 substantially encircling the first conductive electrode 11, and second cell 14 substantially encircling the second conductive electrode 12 generates an electrical potential through an ionic transport medium.

In one embodiment, the conductive electrodes (11 and 12) are selected from a group of metal comprising zinc, iron, copper, aluminium and gold, and carbon, and polymeric group comprising polyphenylene, polyphenylene, polyphenylenevinylene, polyisothianaphthene, polyphenylene sulfide, polyazulene, polyfuran, polythiophene, polyaniline, polypyrrole, and derivatives thereof.

In an embodiment, the cells (13 and 14) include biological, organic, or synthetic macrocycle are intermolecular or intra-molecular polymerized to produce polynuclear complexes. In an embodiment, the biological macrocycle molecule comprises one or more heterocyclic macrocycles includes corrin, corrinoid, chlorin, porphyrin, and bacteriochlorin. In one embodiment, the biological macrocycle molecule is selected from a group comprising hemoglobin, polyhemoglobin, or chlorophyll. In another embodiment, the biological macrocycle molecule comprises one or more polymetallic ions includes ferrous, cuprous, manganese or zinc ions. In one embodiment, the organic or synthetic macrocycle molecule is selected from a group includes crown ether, cryptand, spherand, carcerand, cyclodextrin, cyclophane, and calixarene.

In one embodiment, the cells (13 and 14) comprising macrocycle molecules are positive or negative electrodes based on oxidation-reduction of electron complex, metal ion, or type of metallic conductive material to generate the electrical potential. In an embodiment, the first conductive electrode 11 is in contact with a molecular energy source of the first cell 13, and the second conductive electrode 12 is in contact with a reducible substrate of the second cell 14 with different concentration or different macrocycle with its different center ion.

In an embodiment, the cells (13 and 14) comprise similar macrocycles with similar metal-ions with different concentration generates the electrical potential. In one embodiment, the cells (13 and 14) comprise similar macrocycles with different metal-ions with similar concentration generates the electrical potential. In another embodiment, the cells (13 and 14) comprise similar macrocycles with different metal-ions with different concentration generates the electrical potential. In another embodiment, the cells (13 and 14) comprise different macrocycles with similar metal-ions with similar concentration generates the electrical potential. In another embodiment, the cells (13 and 14) comprise different macrocycles with similar metal-ions with different concentration generates the electrical potential.

In an embodiment, the membrane 15 is a nonwoven fabric, a natural fiber, a synthetic fiber, a polymeric fiber and derivatives or combination thereof. In one embodiment, the synthetic fiber is selected from the group comprising polypropylene, polyvinylidene fluoride, or polyethylene. In an embodiment, the ion transport medium is an aqueous solution or a gel allowing the generation of the electrical potential between the first conductive electrode 11 and the second conductive electrode 12.

Referring to FIG. 1 and FIG. 2, the first cell 13 comprises an electrospun nanofiber of the macrocycle molecules for substantially encircling the first conductive electrode 11. In one embodiment, the second cell 14 comprises an electrospun nanofiber of the macrocycle molecules for substantially encircling the second conductive electrode 12. In an embodiment, the macrocycle molecules are electrospun with one or more polymeric carriers and solvents in an asymmetric electric field to form an electrospun fiber on the surface of the conductive electrodes (11 and 12). In an embodiment, the macrocycle is electrospun with the acceptable polymeric carrier in presence of an abruptly asymmetric electric field to form an electrospun fiber mat. The electrospun fiber mat is made up of networks of plurality of nanofibers on the surface of conductive electrodes (11 and 12).

In an embodiment, the polymeric carriers includes homopolymers and copolymers of the homopolymers, organic or inorganic hybrid polymers, the homopolymers include polyurethanes, polyvinyl alcohol (PVA), polylactic acid, polyethylene-co-vinyl acetate, polycarbonate, poly(iminocarbonates), polymethacrylates, poly(alkyl methacrylic acids), polyacrylates, poly(alkyl acrylic acids), poly(N,N'-diethylaminoethyl methacrylate), poly(N,N'-dialkylaminoalkyl acrylamides), poly(etheylene oxide) (PEO), polyethylene terephthalate, polystyrene, polyvinyl chloride (PVC), poly vinyl phenol, 5 polyacrylamide, poly(N-alkyl acrylamides), poly lactic-co-glycolic acids, polycaprolactone, poly(2-hydroxyethyl methacrylate), poly(vinylidene fluoride), poly(vinylidene chloride), poly(ethylene glycol) (PEG), polyvinyl pyrrolidone, polyethylene, polypropylene, poly(3-hydroxybutyrate), poly(ortho esters), polyanhydrides, poly(ether-ester) azopolymers, poly(dimethyl siloxane), and poly(phosphazenes), and the organic or inorganic hybrid polymers include ethylene oxide-polypropylene glycol condensates, polystyrene, polyamide, polyacrylonitrile, polyimide, poly vinylidene chloride (PVDC), poly tetra-fluoro ethylene (PTFE), polyester, polysulfone, polyolefin, polysilsesquioxane, silicone, epoxy, polyketone, polyether, polyamine, polyphosphazene, polysulfide, polybutadiene, polyethylene, cellulose, polylactones, proteins, poly (vinyl pyrrolidone), and poly(styrene sulfonate), or combinations thereof, and the polymers include preferably water-soluble polymers or hydrolyzable polymers, cellulose, cellulose acetate, or their derivatives or combination thereof.

In one embodiment, the solvent includes water, 1,1,1,3,3,3-hexafluoropropanol, tetrafluoromethane, chloroform, methanol, N,N-dimethylacetamide, N,N-dimethylformamide, tetrahydrofuran, formamide, toluene, 1-propanol, 2-propanol, ethanol, dichloromethane, formamide, dimethylacetamide, methylene chloride, chlorobenzene, chloroform, carbon tetrachloride, chlorobenzene, chloroacetonitrile, carbon disulfide, dimethylsulfoxide, benzene, styrene, acetonitrile, tetrahydrofuran, acetone, methylethylketone, dioxanone, cyclohexanone, cyclohexane, dioxane, 1-nitropropane, tributylphosphate, ethyl acetate, phosphorus trichloride, butanol, glycol, phenol, diethylene glycol, polyethylene glycol, 1,4-butanediol, or their derivatives or combination thereof.

The advantage of the macrocyclic battery 10 according to the invention is the usage of the easily available environmental friendly or biodegradable raw materials. The electrospinning process of the macrocycle molecules in the cells 13 and 14 increases the surface attachment of macrocycles molecules to the electrodes for improving the efficiency for generating electric current. The invention also provides an option for using different macromolecules of synthetic or natural macrocyclic with similar or different central ion with or without polymerization, placed on the surface of the conductive electrodes 11 and 12 to transfer electricity.

The foregoing descriptions comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Although specific terms may be employed herein, they are used only in generic and descriptive sense and not for purposes of limitation. Accordingly, the present invention is not limited to the specific embodiments illustrated herein.

What is claimed is:

1. A macrocyclic battery comprising:
    at least two conductive electrodes, and wherein the at least two conductive electrodes include a first conductive electrode and a second conductive electrode;
    at least two cells, wherein the at least two cells comprise a first cell and a second cell, and wherein the first cell includes a biological, an organic, or a synthetic macrocyclic molecule with a central ion, and wherein the second cell includes a reducible biological, an organic, or a synthetic reducible macrocyclic molecule with a central ion, and wherein the macrocycle molecule is electrospun with one or more polymeric carriers and one or more solvents in an asymmetric electric field to form an electrospun fiber on a surface of the two conductive electrodes; and
    a membrane, said membrane separates the first conductive electrode and the second conductive electrode, and wherein the membrane is selected from a group consisting of a non-woven fabric, a synthetic fiber, a polymeric fiber and derivatives or a combination thereof;
    wherein the first cell substantially encircling the first conductive electrode, and the second cell substantially encircling the second conductive electrode generates an electrical potential through an ionic transport medium, and wherein the biological macrocycle molecule comprises one or more polymetallic ions that include ferrous, cuprous, manganese, or zinc ions, and wherein the organic or synthetic macrocycle molecule is selected from a group consisting of crown ether, cryptand, spherand, carcerand, cyclodextrin, cyclophane, or calixarene.

2. The battery of claim 1, wherein the two conductive electrodes are an anode and a cathode.

3. The battery of claim 1, wherein the two conductive electrodes are selected from a group of metals and non-metals, and wherein the metals are selected from a group consisting of zinc, iron, copper, aluminum and gold, and wherein the non-metals are selected from a group consisting of carbon group and polymeric group, and wherein the polymeric group is selected from a group consisting of polyphenylene, polyenylene, polyphenylenevinylene, polyisothianaphthene, polyphenylene sulfide, polyazulene, polyfuran, polythiophene, polyaniline, polypyrrole, and its derivatives, or combination thereof.

4. The battery of claim 1, wherein the cells including a biological, organic, or synthetic macrocycle molecule are intermolecular or intra-molecular polymerized to produce polynuclear complexes.

5. The battery of claim 1, wherein the biological macrocycle molecule comprises one or more heterocyclic macrocycles that includes corrin, corrinoid, chlorine, porphyrin, or bacteriochlorin.

6. The battery of claim 1, wherein the biological macrocycle molecule is selected from a group consisting of hemoglobin, polyhemoglobin, or chlorophyll.

7. The battery of claim 1, wherein the cells comprising macrocycle molecules are positive or negative electrodes, based on oxidation-reduction of electrode complex, metal ion, or type of metallic conductive material, to generate the electrical potential.

8. The battery of claim 1, wherein the membrane is a non-woven fabric, a natural fiber, a synthetic fiber, a polymeric fiber or its derivatives, or combination thereof.

9. The battery of claim 1, wherein the synthetic fiber is selected from a group consisting of polypropylene, polyvinylidene fluoride, or polyethylene.

10. The battery of claim 1, wherein the ion transport medium is an aqueous solution allowing the generation of the electrical potential between the first conductive electrode and the second conductive electrode.

11. The battery of claim 1, wherein the first cell comprises an electrospun nanofiber of macrocycle molecules on the surface of the first conductive electrode.

12. The battery of claim 1, wherein the second cell comprises an electrospun nanofiber of macrocycle molecules on the surface of the second conductive electrode.

13. The battery of claim 1, wherein the one or more polymeric carriers include homopolymers and copolymers of the homopolymers, organic or inorganic hybrid polymers, wherein the homopolymers include polyurethanes, polyvinyl alcohol (PVA), polylactic acid, polyethylene-co-vinyl acetate, polycarbonate, poly(iminocarbonates), polymethacrylates, poly(alkyl methacrylic acids), polyacrylates, poly(alkyl acrylic acids), poly(N,N'diethylaminoethyl methacrylate), poly(N,N'-dialkylaminoalkyl acrylamides), poly(etheylene oxide) (PEO), polyethylene terephthalate, polystyrene, polyvinyl chloride (PVC), poly vinyl phenol, 5 polyacrylamide, poly(N-alkyl acrylamides), poly lactic-co-glycolic acids, polycaprolactone, poly(2-hydroxyethyl methacrylate), poly(vinylidene fluoride), poly(vinylidene chloride), poly(ethylene glycol) (PEG), polyvinylpyrrolidone, polyethylene, polypropylene, poly(3-hydroxybutyrate), poly(ortho esters), polyanhydrides, poly(ether-ester) azopolymers, poly(dimethyl siloxane), and poly(phosphazenes), and wherein the organic or inorganic hybrid polymers include ethylene oxide-polypropylene glycol condensates, polystyrene, polyamide, polyacrylonitrile, polyimide, poly vinylidene chloride (PVDC), poly tetra-fluoro ethylene (PTFE), polyester, polysulfone, polyolefin, polysilsesquioxane, silicone, epoxy, polyketone, polyether, polyamine, polyphosphazene, polysulfide, polybutadiene, polyethylene, cellulose, polylactones, proteins, poly (vinyl pyrrolidone), and poly(styrene sulfonate), or combinations thereof; and wherein the polymers include preferably water-soluble polymers or hydrolyzable polymers, cellulose, cellulose acetate, or its derivatives, or combination thereof.

14. The battery of claim 1, wherein the one or more solvents includes water, 1,1,1,3,3,3-hexafluoropropanol, tetrafluoromethane, chloroform, methanol, N,N dimethylacetamide, N, N-dimethylformamide, tetrahydrofuran, formamide, toluene, 1-propanol, 2-propanol, ethanol, dichloromethane, formamide, dimethylacetamide, methylene chloride, chlorobenzene, chloroform, carbon tetrachloride, chlorobenzene, chloroacetonitrile, carbon disulfide, dimethylsulfoxide, benzene, styrene, acetonitrile, tetrahydrofuran, acetone, methylethylketone, dioxanone, cyclohexanone, cyclohexane, dioxane, 1-nitropropane, tributylphosphate, ethyl acetate, phosphorus trichloride, butanol, glycol, phenol, diethylene glycol, polyethylene glycol, 1,4-butanediol, or its derivatives, or combination thereof.

\* \* \* \* \*